US010780727B2

(12) United States Patent
MacPherson et al.

(10) Patent No.: US 10,780,727 B2
(45) Date of Patent: Sep. 22, 2020

(54) SECURITY DISPLAY DEVICES, THEIR PRODUCTION AND USE

(71) Applicant: Bank of Canada, Ottawa (CA)

(72) Inventors: Charles Douglas MacPherson, Santa Barbara, CA (US); Theodoros Garanzotis, Ottawa (CA)

(73) Assignee: BANK OF CANADA, OTTAWA (CA)

( * ) Notice: Subject to any disclaimer, the term of this patent is extended or adjusted under 35 U.S.C. 154(b) by 0 days.

(21) Appl. No.: 15/801,766

(22) Filed: Nov. 2, 2017

(65) Prior Publication Data

US 2018/0126768 A1 May 10, 2018

Related U.S. Application Data

(62) Division of application No. 14/345,808, filed as application No. PCT/CA2012/050650 on Sep. 19, 2012, now Pat. No. 9,834,029.

(60) Provisional application No. 61/536,662, filed on Sep. 20, 2011.

(51) Int. Cl.

| | |
|---|---|
| ***B42D 25/00*** | (2014.01) |
| ***G09F 13/24*** | (2006.01) |
| ***B42D 25/30*** | (2014.01) |
| ***B42D 25/425*** | (2014.01) |
| ***G02B 26/00*** | (2006.01) |
| ***B42D 25/369*** | (2014.01) |
| ***B42D 25/364*** | (2014.01) |
| ***B82Y 20/00*** | (2011.01) |
| ***G07D 7/12*** | (2016.01) |

(Continued)

(52) U.S. Cl.

CPC ............. *B42D 25/30* (2014.10); *B42D 25/00* (2014.10); *B42D 25/29* (2014.10); *B42D 25/364* (2014.10); *B42D 25/369* (2014.10); *B42D 25/425* (2014.10); *B82Y 20/00* (2013.01); *G02B 26/004* (2013.01); *G02B 26/005* (2013.01); *G07D 7/12* (2013.01); *G09F 13/24* (2013.01); *B42D 25/24* (2014.10)

(58) Field of Classification Search

CPC ....................................................... G09F 13/24

USPC ....... 40/406, 407, 439; 116/270; 428/14, 29, 428/542.6; 446/176, 197, 199

See application file for complete search history.

(56) References Cited

U.S. PATENT DOCUMENTS 1,014,759 A * 1/1912 Kovacs ................. A63H 33/22 446/146

2,315,240 A * 3/1943 Ashenberg ............. G09F 13/24 40/406

4,799,435 A 1/1989 Boutroy (Continued)

FOREIGN PATENT DOCUMENTS

CN 101802111 A1 8/2010

DE 102009023982 A1 12/2010

(Continued)

OTHER PUBLICATIONS

European Search Report and Written Opinion for the European Patent Application No. 18202817, dated Apr. 29, 2019, 9 pages.

*Primary Examiner* — Kyle R Grabowski

(57) ABSTRACT

Security documents often incorporate security devices to prevent or hinder counterfeiters. Disclosed herein are security devices that include a fluid or fluids within the devices. Such devices, and security documents that include them, afford new techniques to check whether a security document is a legitimate or counterfeit copy.

5 Claims, 11 Drawing Sheets a) 11 15 12 A A' 10 b) 14 10 12 13 16 11

(51) Int. Cl.

| | |
|---|---|
| ***B42D 25/29*** | (2014.01) |
| *B42D 25/24* | (2014.01) |

(56) References Cited

U.S. PATENT DOCUMENTS

| | | | |
|---|---|---|---|
| 5,593,160 | A | 1/1997 | Constantine et al. |
| 6,270,122 | B1 | 8/2001 | Shadle et al. |
| 6,318,760 | B1 | 11/2001 | Shadle et al. |
| 6,641,691 | B2 | 11/2003 | Shadle et al. |
| 6,741,523 | B1 | 5/2004 | Bommarito et al. |
| 9,182,292 | B2 | 11/2015 | Ambrozy et al. |
| 2002/0014768 | A1 | 2/2002 | Shadle et al. |
| 2003/0033965 | A1 | 2/2003 | Van Lint |
| 2008/0075668 | A1 | 3/2008 | Goldstein |

FOREIGN PATENT DOCUMENTS

| | | | |
|---|---|---|---|
| EP | 0241322 | A1 | 10/1987 |
| EP | 0914538 | B1 | 6/2000 |
| EP | 2860500 | A1 | 4/2015 |
| JP | 2007169842 | A | 7/2007 |
| WO | 2007008211 | A2 | 1/2007 |
| WO | 2009043482 | A1 | 4/2009 |

* cited by examiner a)

SECURITY DISPLAY DEVICES, THEIR PRODUCTION AND USE

CROSS-REFERENCE TO RELATED APPLICATIONS

This application claims priority to and the full benefit of U.S. Non-Provisional application Ser. No. 14/345,808, which application is a United States National Phase filing of International Application No. PCT/CA2012/050650 filed on Sep. 19, 2012 which claims priority to and the full benefit of U.S. Provisional Application Ser. No. 61/536,662, filed Sep. 20, 2011, and titled "Security Display Devices, Their Production and Use," the entire contents of which applications are incorporated herein by reference.

FIELD OF THE INVENTION

The invention relates to optical devices, as well as methods for their production and use. Such optical devices may, for example, be incorporated into security documents of value, including documents which may be subject to counterfeiting, such as passports, banknotes and other articles. In selected devices, optical variability may be inherent, or inducible by user interaction with the devices.

BACKGROUND TO THE INVENTION

Bank notes and other security documents often incorporate optically variable devices (OVDs) such as diffraction gratings or holographic optical microstructures as security features against copy and counterfeit. The increased use of such devices has been motivated by progress in the fields of computer-based desktop publishing and scanning, which render conventional security print technologies, such as intaglio and offset printing, increasingly susceptible to counterfeit. One way to strengthen security documents against counterfeit is to combine security print with optically variable devices whose structures cannot be replicated by scanners, and which can exhibit optically variable effects such as colour changes by diffraction, movement effects, and distinct switches between images.

For example, holograms are widely used as security features in credit cards as they cannot be reproduced by photographic or photocopying techniques, wherein for example the image beneath the hologram is only visible when the document is tilted. Other OVDs include polymer or laminate microstructures in the form of foils that exhibit colour shifts in transmitted light passing through the foil and/or ambient light reflecting from the foil. Tilting the foil results in a visible colour-shift effect due for example to a laminate microstructure, or Bragg stacking within the foil. Such devices provide particularly useful surface security features in applications where the substrate to which they are applied is flexible or foldable, such as in banknotes.

Security devices, including those comprising OVDs, often take the form or shape of strips or threads. Such threads are traditionally made from a transparent film provided with a continuous reflective metal layer, vacuum deposited aluminum on polyester film being the commonest example. Banknotes incorporating such security devices have been in general circulation in many countries for many years. When such security elements are fully embedded in security paper, and the paper is subsequently printed to provide the security document (e.g. a banknote), the thread cannot be discerned readily in reflected light but is immediately apparent as a dark image when the document is viewed in transmitted light. Such threads are effective against counterfeiting by printing or photocopying, since the optically variable effect cannot be simulated accurately, for example by printing a line on the paper.

Also known in the art is the use of polymer-based films or sheets as an alternative basic substrate for the production of security documents. In some countries, such films are used instead of paper-based substrates for bank note production. In comparison to bank notes manufactured using paper substrates, those made from polymer film are highly resilient to tearing, wear and abrasion. As such the bank notes have a longer usable lifespan, and thus may remain in circulation for a significant period of time.

There is a continuing need for improved security devices and features for security documents, as well as improved methods for their manufacture. In particular, the need extends to devices that are difficult to counterfeit, yet relatively inexpensive to manufacture, which are suitable for application to a range of substrate materials including polymer films.

SUMMARY OF THE INVENTION

It is an object of the invention, at least in selected embodiments, to provide an optically variable security device.

It is another object of the invention, at least in selected embodiments, to provide a method to check whether a security document is a legitimate or counterfeit security document.

Certain exemplary embodiments provide a security device for a security document, the device comprising at least one fluid that is redistributable within the device in response to an external stimulus, so that at least a portion of the fluid undergoes translocation of at least 1 mm by at least one of fluid flow, expansion or contraction, thereby to cause a change in the optical properties of the device. In some exemplary embodiments, the device may comprise a nanofluidic or microfluidic structure, the fluid retained by and redistributable within the structure. In some exemplary embodiments, the nanofluidic or microfluidic structure comprises walls to define at least one conduit at least portion of which has a dimension of 1 nm to 100 μm between opposing walls, or a dimension of 1 nm to 100 nm between opposing walls, or a dimension of 100 nm to 100 μm between opposing walls the fluid redistributable in the device by fluid flow through the conduit(s). In some exemplary embodiments, the fluid comprises at least one solid, liquid, or gas, each optionally in particulate form, or mixtures, colloids, suspensions, dispersions, solutions or emulsions thereof. In some exemplary embodiments, the fluid is redistributable by fluid flow and/or expansion in response to an external force applied to at least a portion of the device, thereby to cause the fluid to flow and/or expand into regions of the device previously devoid or substantially devoid of the fluid. In other exemplary embodiments, the at least one fluid comprises at least two fluids that mix upon application of the external stimulus, thereby to cause a change in an appearance of the device due to the interaction of the fluids and/or components thereof. In other exemplary embodiments, the security device comprises an embossed microstructure.

In some exemplary embodiments, the fluid may be selected independently from:

a liquid, a gas, a mixture or dispersion or solution or colloid or suspension of a gas in a liquid, a liquid foam, a mixture or dispersion or colloid or suspension of a liquid in a liquid, an emulsion, a mixture or dispersion or colloid or suspension of a solid in a liquid, a sol, a gel, a liquid crystal; an oil/water mixture optionally comprising a surfactant; a liquid dye, a solution of a dye in water or an organic solvent, a dispersion or suspension of a pigment in a liquid optionally with colour-changing and or colour-shifting properties; a magnetic fluid or a ferrofluid (dispersed or suspended magnetic particles in a liquid that respond to an applied magnetic field); an electrophoretic or electrokinetic fluid (dispersed or suspended charged particles in a liquid that respond to an applied electric field); electrorheological fluids (e.g. fluids that change viscosity in response to applied electric field such as that supplied by Smart Technology Limited, fluid LID3354S), a magnetorheological fluid, a shear thickening or thixotropic material; a high refractive index oil, a low refractive index oil, a fluorinated fluid, Fluoroinert™ electronic liquids such as 3M FC-770; an ionic liquid or liquid electrolyte, an ionic solution, a liquid metal, a metallic alloy with a low melting point such as gallium or and indium containing alloys (such as Indalloy® alloys offered by Indium Corporation); a liquid with a large temperature expansion coefficient; a solution or a dispersion whereby a dissolved or dispersed phase (a gas, a liquid, a solid) goes into or out of solution or dispersion in response to an external stimulus (such as, but not limited to, a change in pressure and or temperature). In other exemplary embodiments the walls of the device may comprise one or more materials selected from: polymers, films, and laminates comprising materials such as thermoplastics, polyolefins, PP, PE, PET, Ultra-Violet curable polymers including free radical systems and cationic systems, Electron-beam curable polymers, BOPP, fluoropolymers, Cytop™, cyclic olefins, thermosetting polymers, spin-on-glass and Sylgard™ silicon elastomers, photoresists including two-photon photoresists, and derivates and mixtures thereof.

In certain exemplary embodiments, the walls define a reservoir for the fluid, wherein application of pressure to the reservoir causes flow of the fluid into portions of the device other than the reservoir, and optionally upon removal of said pressure, the reservoir at least substantially recovers its original shape and form, thereby to draw the fluid from said other portions of the device and back into the reservoir.

In other exemplary embodiments of such devices, the fluid may comprise a liquid with macroscopic and/or microscopic particles of solid or gas contained in the liquid, the particles reacting to redistribution of the fluid induced by the external force, so that they form, move, coalesce, rotate, precipitate, aggregate, dissolve, flow or collect in the device. In other exemplary embodiments, the presence and/or visibility of the particles in the liquid is dependent upon the external influence and fluid distribution in the device.

In further exemplary embodiments there is provided any security device as disclosed herein, further comprising a piezoelectric element, whereby manipulation of the piezoelectric element causes the external influence, for redistribution of the fluid in the device by mechanical pressure and/or electrowetting.

In further exemplary embodiments, the fluid redistribution and thus observed change in optical appearance of any security device disclosed herein occurs in less than 20 seconds, preferably less than 10 seconds, more preferably less than 5 seconds.

In other exemplary embodiments, there is provided a security device for a security document, the device comprising a fluidic structure comprising one or more fluids arranged as a pattern or image that is visible to the naked eye, or with the assistance of a screening tool. In some examples, the fluidic structure is a microfluidic or nanofluidic structure to provide a high-definition pattern or image.

In further exemplary embodiments there is provided a security device for a security document, the device comprising a fluidic structure comprising one or more fluids arranged as a pattern or image that is visible to an unaided human eye, or with the assistance of a screening tool. In some such embodiments, the fluidic structure is a microfluidic or nanofluidic structure, optionally embossed, to compose a high-definition pattern or image that is visible to an unaided human eye. Further, in some such embodiments, at least a portion of the fluid in the microfluidic or nanofluidic structure may optionally be redistributable within the device in response to an external stimulus, so that at least a portion of the fluid undergoes translocation of at least 1 mm by at least one of fluid flow, expansion or contraction, thereby to cause a change in the optical properties of the device.

In still further exemplary embodiments there is provided a composite security device comprising:

a first security device as described here comprising fluid redistributable within the device in response to an external influence; and a second security device as described herein in which the fluid is generally not redistributable such that the second security device provides a static image or pattern;

optionally one or more further security devices as described herein;

wherein the optical properties of the composite security device are dependent upon the interaction of at least the first and second security devices, and also dependent upon the effect of an external influence upon the first security device.

In further exemplary embodiments there are provided uses of security devices as disclosed herein, as security features of security documents.

In further exemplary embodiments there is provided a security document comprising:

a core material; and at least one security device as disclosed herein, present on at least one side of the core material, or at least partially embedded into the core material, such that the device is at least partly visible in reflected light from said at least one side. In some such embodiments, the core material may comprise at least one material selected from the group consisting of: paper, polymer, plastic, and combinations or hybrids thereof. In certain exemplary embodiments fluid redistribution causes a visible change in the appearance of the document upon hand-manipulation, flexing, bending, folding, touching or pressing the security document, or a portion thereof. Optionally, the document may further comprise one or more layers or printed features to mask or obscure the security device or parts thereof.

In further exemplary embodiments of the security documents, the security device may comprise a plurality of conduits arranged in a pattern, the conduits having a raised profile compared to the plane of the document to give the device the appearance of being embossed upon the document.

In further exemplary embodiments there is provided a method for manufacture of a bank note, comprising the steps of:

providing a polymer core substrate;

adhering to or embossing upon the substrate a security device as disclosed herein.

In further exemplary embodiments there is provided a method for checking whether a security document is a legitimate or counterfeit document, the security document comprising at least one security device as disclosed herein on at least one side thereof, the method comprising the steps of:

causing the fluid to be redistributed within the device;

observing an optical change in the appearance of the security document caused by the redistribution of the fluid.

Optionally, the step of causing comprises applying an external influence to the security document either by hand manipulation of the document or with the assistance of a screening tool.

DEFINITIONS

Figure 1A:
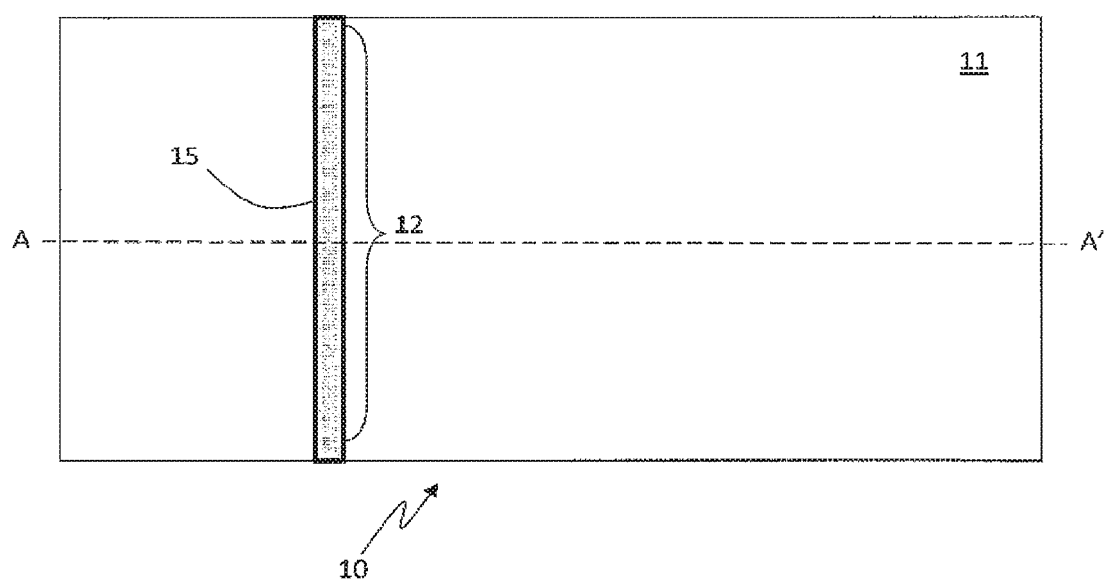
FIG. 1*a* illustrates a top plan view of a security document incorporating an example security device.

External influence: pertains to any force, action, radiation, field, movement, that has an affect upon a security device as described herein, to cause fluid in the device to be redistributed within the device. The influence may involve physical contact with the device (e.g. mechanical pressure upon the device) or may be a remote influence without physical contact (e.g. radiation of any type falling upon the device). An external influence may also be selected from the following non-limiting list of examples:

a change in temperature;

exposure to visible or beyond visible light;

shaking, tipping, flipping, or vibrating the device;

acceleration or deceleration;

an electric field;

a magnetic field;

a change in potential difference across the device;

induced high or low g-forces; and bending, folding, flexing or pressing the device, or a part thereof.

In some exemplary embodiments, an external influence may be brief and temporary and yet still be sufficient to achieve fluid redistribution in a security device sufficient for a change in optical appearance of the device. For example, a brief burst of external stimulus may in some examples trigger an optical change that is permanent or last sufficient time (e.g. 1 second to a few minutes) for user observation. In other exemplary embodiments, it may be necessary to apply a continuous or semi-continuous external stimulus to the security device to achieve fluid redistribution that can be observed by a user. In some such embodiments, removal of the external stimulus may then cause the fluid distribution to revert back to a situation similar or indistinguishable from that before the external stimulus was applied, such that the security device then re-assumes an optical appearance prior to application of the external stimulus.

Fluid: any of, a liquid, a gas, a mixture or dispersion or solution or colloid or suspension of a gas in a liquid, a liquid foam, a mixture or dispersion or colloid or suspension of a liquid in a liquid, an emulsion, a mixture or dispersion or colloid or suspension of a solid in a liquid, a sol, a gel, a liquid crystal; an oil/water mixture optionally comprising a surfactant; a liquid dye, a solution of a dye in water or an organic solvent, a dispersion or suspension of a pigment in a liquid optionally with colour-changing and or colour-shifting properties; a magnetic fluid or a ferrofluid (dispersed or suspended magnetic particles in a liquid that respond to an applied magnetic field); an electrophoretic or electrokinetic fluid (dispersed or suspended charged particles in a liquid that respond to an applied electric field); an electrorheological fluids (e.g. fluids that change viscosity in response to applied electric field such as that supplied by Smart Technology Limited, fluid LID3354S), a magneto-rheological fluid, a shear thickening or thixotropic material; a high refractive index oil, a low refractive index oil, a fluorinated fluid, Fluoroinert™ electronic liquids such as 3M FC-770; an ionic liquid or liquid electrolyte, an ionic solution, a liquid metal, a metallic alloy with a low melting point such as gallium or and indium containing alloys (such as Indalloy® alloys offered by Indium Corporation); a liquid with a large temperature expansion coefficient; a solution or a dispersion whereby a dissolved or dispersed phase (a gas, a liquid, a solid) goes into or out of solution or dispersion in response to an external stimulus (such as, but not limited to, a change in pressure and or temperature).

Optionally, the fluid may comprise a single phase of a liquid, gas or particulate solid, or alternatively the fluid comprises more than one phase. Optionally, the fluid may undergo a phase change in response to one or more external stimulus, wherein a phase change may comprise a transition of at least a portion of the fluid from one state (e.g. solid, liquid or gas) to any other state.

Microfluidics: is known as the study of the behavior, manipulation, and control of fluids that are confined to structures of micrometer (typically 0.1-100 μm) characteristic dimensions.

Microfluidic devices: are known to be characterized by conduits or channels with diameters ranging roughly between 100 nm and 100 microns, optionally involving particles with diameters ranging roughly from 10 nm to 10 microns. At these length scales, the Reynolds number is low and the flow is usually laminar, but the mass transfer Peclet number is often large, leading to unique microfluidic mixing regimes. Nanofluidics: is known to be the study of the behavior, manipulation, and control of fluids that are confined to structures of nanometer (typically 1-100 nm) characteristic dimensions. Fluids confined in these structures exhibit physical behaviors not observed in larger structures, such as those of micrometer dimensions and above, because the characteristic physical scaling lengths of the fluid, (e.g. Debye length, hydrodynamic radius) very closely coincide with the dimensions of the nanostructure itself.

Nanofluidic devices: are known to be characterized by comprising one or more conduits or channels with diameters ranging roughly between 1 nm and 100 nm, optionally involving particles with diameters ranging roughly from 0.1 nm to 10 nm.

Optical change: refers to any change in the appearance of a security device as disclosed herein, or components thereof, that is microscopic or macroscopic in nature, and which is visible to the eye or to a suitable 'reader' or detector in either visible or non-visible light or by other forms of electromagnetic radiation. An optical change would include, but is not limited to, a color change in the visible part of EM spectrum, a change in location or distribution of a fluid, a change in refractive index for example or a fluid or device component, change in light transmission or reflection for example or a fluid or device component. Piezoelectric layer: refers to any layer formed from any material that: (1) can be change shape, thickness, configuration or form, either permanently or temporarily, under conditions of an electrical potential difference or an increased electrical potential difference by virtue of the piezoelectric properties of the materials of the layer. Piezoelectric layer also refers to any layer that exhibits and altered charge distribution or charge properties upon application to the material of the layer mechanical stress or pressure. For example, the thickness of the layer may be changeable between a first state absent electrical potential difference, (or under less electrical potential difference) and a second state under increased electrical potential difference. Preferably the piezoelectric layer is reversibly changeable such that the layer can be transitioned between first and second states multiple times upon repeated application and removal of the electrical potential difference, or repeated increase and decrease of electrical potential difference. The degree shape or thickness change of the piezoelectric layer (for example the capacity of the layer to be reduced or increased in thickness upon application or increase of electrical potential difference) may be established according to the material used to form the layer. For example, different polymers or crystals may be less or more inclined to change shape or thickness compared to other materials under the same degree of electrical potential difference. Examples of materials suitable for use in the formation of piezoelectric layers include but are not limited to ferroelectric and pyroelectric materials such as poly(vinylidene fluoride) (PVDF) and its copolymer with trifluoroethylene P(VDFTrFE) (reference High electrostrictive). The piezoelectric layer may be made of materials in polyvinylidene difluoride (PVDF) or PVDF derivatives. In one example, the piezoelectric layer may be made of poly(vinylidene fluoride-trifluoroethylene) (P(VDF-TrFE)) or poly(vinylidene fluoride/tetrafluoroethylene) (P(VDF-TeFE)). In another example, the piezoelectric layer may be made of a blend of a material in PVDF or PVDF derivatives and at least one of lead zirconate titanite (PZT) fibers or particles, polymethylmethacrylate (PMMA), or poly(vinyl chloride) (PVC).

Inorganic materials that can deposited by vacuum deposition or sol gel process including lead zirconate titanite (PZT) and barium titanite, and zinc oxide. Further examples of materials suitable to used as a component material for the piezoelectric layer include, but are not limited to, those disclosed in Chu et al. (2006) Science, Vol. 313, pages 334-336, and Bauer et al. Dielectrics and Electrical Insulation, IEEE Transactions Publication Date: October 2006 Volume: 13 Issue: 5, pages: 1149-1154, both of which are incorporated herein by reference. Furthermore, a piezoelectric layer may optionally comprise or consist of an adhesive material such as but not limited to: acrylated urethanes, methacrylate esters, mercapto-esters and UV curable materials. A piezoelectric layer may be applied under any conditions and in any way. In selected embodiments, the layer is applied by printing such as by Gravure printing under atmospheric conditions. Moreover, the piezoelectric properties of a piezoelectric layer may be imparted to the layer either before, during or after its application or formation upon a reflector or absorber layer, in accordance with the teachings herein. In one example of a piezoelectric layer, when an electric field having the same polarity and orientation as the original polarization field is placed across the thickness of a single sheet of piezoceramic, the piece expands in the thickness or "longitudinal" direction (i.e. along the axis of polarization). At the same time, the sheet contracts in the "transverse" direction (i.e. perpendicular to the axis of polarization). The opposite may be the case for other piezoelectric materials.

"Redistribution"/"redistributable": refers to a change in position or translocation of a fluid within a security device as disclosed herein by flow and/or expansion/contraction of the fluid so that at least a portion of the fluid is moved by at least 1 mm, or more than 5 mm, or more than 10 mm. Such redistribution includes movement of fluid or a portion thereof from one place to another within the device (by fluid flow), and alternatively (or additionally) may include fluid expansion or contraction, when an external stimulus is applied or removed from (or increased or decreased upon) the device. Thus, upon redistribution the entirety of a contiguous body of fluid may undergo translocation from one location to another in a security device. Alternatively, only a portion of the fluid may undergo translocation, whilst a location of another portion may remain substantially unchanged. Alternatively, the location of a body of fluid may remain substantially unchanged with the exception of a small portion that undergoes expansion, contraction or translocation. Thus, "redistribution" encompasses any degree of movement, flow, expansion, contraction, translocation of any portion of a body of fluid by at least one millimeter within a security device as disclosed herein.

Security document: refers to any document, item or article of manufacture of any importance or value, which might be subject to counterfeit copying. In selected embodiments, a security document may include features or devices intended to show that the document, item or article is a genuine and legitimate version, and not a counterfeit copy of such a document, item or article. For example, such security documents may include security features such as those disclosed herein. Such security documents may include, but are not limited to, identification documents such as passports, citizenship or residency documents, drivers' licenses, bank notes, cheques, credit cards, bank cards, and other documents, as well as labeling or other security features, for items of monetary value such as designer clothing, accessories, or any other branded products where it is desired to indicate or demonstrate the authenticity or legitimacy of the product compared to a counterfeit copy. Such security features may be permanently or removably incorporated therein depending upon the nature of the document, item or article, and the intended end user. In the case of banknotes, the substrate material (e.g. paper or plastic or hybrids thereof) may have a thickness of from 5-100 μm, preferably of from 11-40 μm or from 80-100 μm.

Security device or feature: refers to any device or feature that may be added to a security document for the purposes of making that security document more difficult to copy or replicate. In selected embodiments, the device may be planar or thin so that it appears flush with a substrate of a security document when applied to the document. For example, the device may have a thickness of 0.1-20 μm, preferably of from 1-10 μm. In other embodiments, the security device may comprise a structure that causes a raised profile of embossed appearance upon application of the device of a substrate.

Window: refers to a region or portion of a security device in which a component of a security device, such as a security thread, is exposed for visual inspection, because there is little or no translucent or opaque material to obscure the view of the exposed portions. A window may be present even if there are transparent or translucent layers, for example of film, to cover the security device or components thereof, because the exposed portions of the security thread are still visible, at least in part, through the film. In further selected embodiments as disclosed herein 'window' refers to one or more portions of a security device as disclosed herein in which a masking layer does not extend across all of the surface of a security thread, such that portions of the security thread are exposed for visual inspection in reflective light. In other embodiments, a window may refer to one or more portions of a security device that are exposed on both sides, recto and verso, such that that the exposed portions can be viewed in reflective light on either side, and/or in transmitted lighted by looking through the device.

DETAILED DESCRIPTION OF THE INVENTION

Herein described are security devices that, at least in selected embodiments, are useful as security features for security documents. The invention encompasses the devices themselves, security documents comprising them, as well as methods for their manufacture and use. Previously, security devices for use in security documents have been developed with colour change or display change properties with complex layered, optical or electronic structures, which are often expensive to manufacture. The inventors have endeavored to develop an entirely new class of security device that in selected embodiments are relatively simple, robust, and inexpensive to manufacture. Moreover, in selected embodiments the security devices disclosed herein may change their appearance through an optical change upon interaction of a user either directly or with the assistance of a screening tool.

To this end, the inventors have developed security devices that comprise a fluid integrated therein, wherein the fluid is observable and selectively redistributable within the device in response to an external stimulus. In selected embodiments, for example, the optical properties of the fluid within the device, or device components associated with the fluid, can be altered in response to an external stimulus. The devices are not limited with regard to the nature of the fluid, the method of fluid containment or redistribution, nor the nature of the external stimulus. Selected embodiments are nonetheless described herein.

Thus, certain exemplary embodiments provide for any security device for a security document, wherein the security device comprises at least one fluid contained within the device. Preferably, the fluid is observable in the device to a user of the device, or to a user of a security document comprising the device.

The fluid may be contained in the device via any means, and optionally be restricted within the device in terms of its flowability or movement. In other embodiments (see later) the fluid may be permitted to move, flow, expand, undergo translocation or be redistributed within the device in response to an external stimulus.

In selected embodiments, the fluid may impart to the device an optical appearance that is not readily reproducible upon copying the device via scanning, printing or photocopying techniques. This optical appearance may take on any suitable form, and may depend upon the nature of the fluid, its constituents, and its containment within the device. Optionally, the fluid, and/or any device component associated with the fluid, may undergo an optical change that can be detected by the unaided human eye when an external stimulus is imposed upon the device. In other embodiments, a screening tool or detection device may be required to detect the optical change. Thus, in selected embodiments there is provided a security device for a security document, the device comprising at least one fluid that is redistributable within the device in response to an external stimulus, so that at least a portion of the fluid translocates at least 1 mm by at least one of fluid flow, expansion or contraction, thereby to cause a change in the optical properties of the device.

Figure 11:
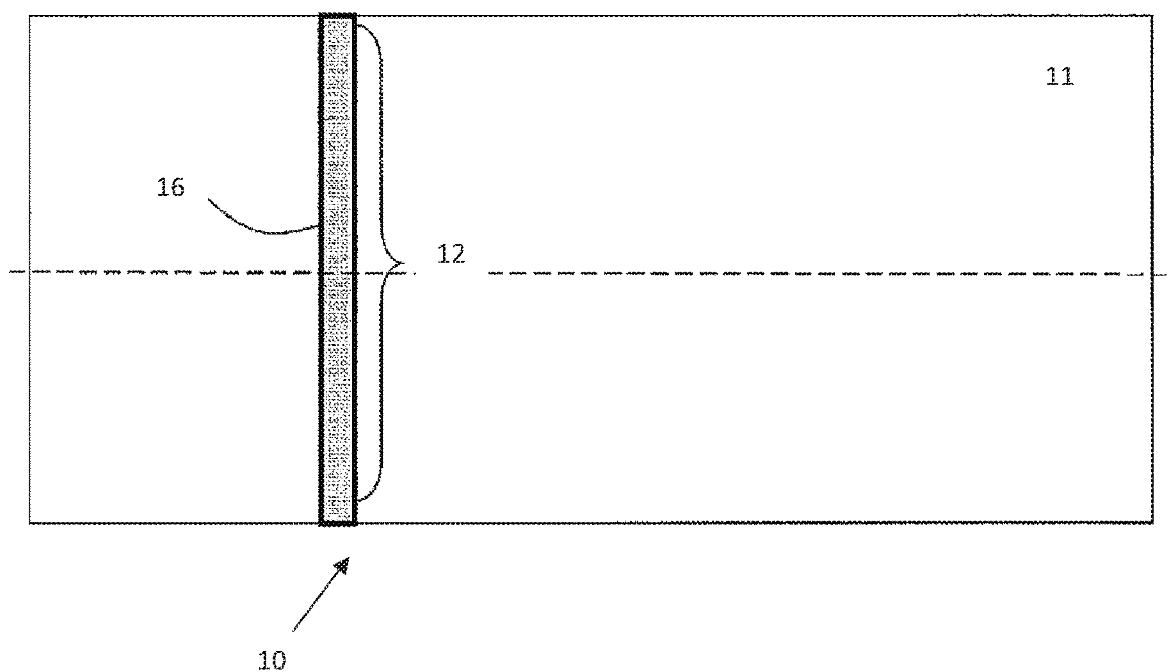
FIG. 11 illustrates a top plan view of a security document incorporating an example security device.

However, referring to FIG. 11, in further embodiments, the security document 10 includes a core substrate material 11 and a security device 12 adhered or otherwise affixed to the substrate 11. The security document 10 for example involving fluidic, microfluidic or nanofluidic structures, the security device 12 may comprise one or more fluids 16 that optionally remain unchanged in terms of their distribution and/or appearance in the device 12, even when an external stimulus is applied. In such devices 12, a fluidic structure comprising one or more fluids 16 may be arranged as a pattern or image that is visible to the naked eye, or with the assistance of a screening tool. For example, the fluidic structure may take the form of a microfluidic or nanofluidic structure to provide an optionally static, high-definition pattern or image, optionally with very high colour saturation by virtue of the structure and liquid constituents of the device, wherein the pattern or image is difficult to copy, replicate or counterfeit at least by traditional copying/printing methods. Therefore, such embodiments provide for security devices 12 that may appear as static, optionally high definition patterns or images, wherein the structure fluid content of such devices in itself helps to render the devices difficult to copy or counterfeit.

Example embodiments thus encompass a security device for a security document, the device comprising a fluidic structure comprising one or more fluids arranged as a pattern or image that is visible to an unaided human eye, or with the assistance of a screening tool, without necessarily involving fluid redistribution in the device. For example, the fluidic structure may be a microfluidic or nanofluidic structure, optionally produced by an embossing process, to compose a high-definition or striking pattern or image that is visible to an unaided human eye. This pattern or image thus provides one means to assess and verify the authenticity of the security device (or a document comprising the device): the appearance and high-fidelity of the image or pattern, by virtue of the appearance and fluid content of the microfluidic or nanofluidic structure and its constituent conduits, itself provides a degree of security. In other words, the device in itself is difficult or impossible to replicate by standard printing and copying techniques such as intaglio offset printing, regardless of whether or not the fluid contained in the device is redistributable. However, in still further embodiments such devices may further encompass a second means to assess and verify the authenticity of the security device (or a document comprising the device) by fluid redistribution: i.e. at least a portion of the fluid in the microfluidic or nanofluidic structure may be redistributable within the device in response to an external stimulus, so that at least a portion of the fluid undergoes translocation of at least 1 mm by at least one of fluid flow, expansion or contraction, thereby to cause a change in the optical properties of the device. Thus, at least in selected embodiments, the security devices disclosed herein have two stages of authentication: the first being the static appearance of the device as described above, and the second being dynamic by a perceived change in the optical properties of the device (by fluid redistribution) when an external influence is applied.

For example, in selected embodiments there is provided a security device for a security document, the device comprising a fluidic structure comprising one or more fluids arranged as a pattern or image that is visible either to the naked eye, or alternatively with the assistance of a corresponding screening tool suitable to detect the security device. If the fluidic structure of the device is a microfluidic or nanofluidic structure, the device may thus provide a static, high-definition pattern or image that remains substantially unchanged even upon exposure of the device to an external influence. Therefore, such devices differ from other embodiments that undergo a change of optical properties in response to an external influence.

Still further embodiments provide for a composite security device comprising:

(1) a first security device as described herein, comprising one or more fluids that are redistributable in response to an external influence; and (2) a second security device as described herein, comprising one or more fluids that are substantially unable to undergo redistribution even in response to an external influence;

(3) optionally one or more further security devices according to (1) and/or (2) above;

wherein the optical properties of the composite security device are dependent upon the interaction of at least the first and second security devices (and others if present), and also dependent upon the effect of an external influence upon the first security device. In this way, the composite security device may appear as a pattern or image (by virtue of the optical properties of at least the second security device), but the optical properties or appearance of the composite security device may be caused to change in response to an external influence (by virtue of the altered optical properties of at least the first security device).

Thus, in selected embodiments the security devices disclosed herein comprise a nanofluidic or microfluidic structure, the fluid retained by and (at least in some embodiments) redistributable within the structure. In this way, selected embodiments comprise a sealed or substantially sealed structure comprising walls to define a lumen for containing the fluid, wherein the walls define at least one conduit or channel for the fluid, at least a portion of which narrows to a dimension of from 1 nm to 100 μm between opposing walls (thus to provide the nano or microfluidic structure). In other embodiments apparent from the foregoing, a plurality of conduits or channels may be present in the structure, for example in a desired pattern or shape.

Optionally, the fluid is sealed into the security device.

Optionally, an optical change in the device occurs in response to one or more of:

a change in temperature;
exposure to visible or beyond visible light;
shaking, tipping, flipping, or vibrating the device;
acceleration or deceleration;
an electric field;
a magnetic field;
a change in potential difference across the device;
induced high or low g-forces; and
bending, folding, flexing or pressing the device, or a part thereof.

In selected embodiments, the security devices described above may comprise fluid comprising solid, liquid or gas particles. Optionally, the particles are movable within the device upon one or more of:

flow of the fluid through the device;
shaking, tipping, or vibrating the device;
acceleration or deceleration;
an electric field;
a magnetic field;
a change in potential difference across the device;
induced high or low g-forces; and
bending, folding, flipping, flexing or pressing the device, or a part thereof; and the movement of the particles may optionally give rise to a change in the optical appearance of the device. For example, the particles may move within the device so that they form, coalesce, precipitate, aggregate, flow or collect in the device. Each particle may be microscopic or macroscopic, but even microscopic particles may optionally give rise to an optical change if they are collectively altered in response to an external stimulus. For example, the particles may be in some way changeable, dissolvable, formable, precipitable, movable or redistributable within the device upon application of an external stimulus to the device.

In selected embodiments, the fluid may be a gas, or comprise a combination of a liquid and a gas. Alternatively, the fluid may comprise at least two fluids that mix upon application of the external stimulus, thereby to cause a change in the appearance of the device. For example, the mixing of the at least two fluids may cause a colour change in the mixed fluids compared to each of the fluids prior to mixing. Optionally, the mixing of the fluids may result in the formation of a colloid, suspension, dispersion or emulsion. In alternative embodiments, at least one of the fluids may be a colloid, suspension, dispersion or emulsion, and mixing of the fluids may cause particles in said colloid, suspension, dispersion or emulsion at least partially to dissolve.

In any of the embodiments described the security device may be produced by any embossing technique known in the art, or may be produced by embossing a security document substrate (e.g. a polymer substrate). Selected embodiments thus encompass a security document with an embossed security device in accordance with the teachings herein. For example, embossing may be performed into a polymer layer that is part of carrier foil containing a release layer or can be part of a laminate structure. In some embodiments, the embossing can be achieved by hot embossing techniques where the polymer layer to be embossed is heated to a sufficient temperature to permit the embossing of a micro or nano structure pattern into the film with a reasonable pressure and at a satisfactory roll or sheet speed. In other embodiments, the embossing can also be performed by UV soft emboss techniques in which a micro or nanofluidic structure is embossed into an uncured or uncrosslinked UV lacquer or varnish and exposed to a UV light source. The UV crosslinking or curing occurs or begins during or shortly after the embossing process. The embodiments encompassed herein, however, are not limited to such techniques, and other embossing techniques may be used where appropriate.

In any of the embodiments described herein, the fluid may take any form, and optionally the fluid is selected from: any one or more of a liquid, a gas, a mixture or dispersion or solution or colloid or suspension of a gas in a liquid, a liquid foam, a mixture or dispersion or colloid or suspension of a liquid in a liquid, an emulsion, a mixture or dispersion or colloid or suspension of a solid in a liquid, a sol, a gel, a liquid crystal; an oil/water mixture optionally comprising a surfactant; a liquid dye, a solution of a dye in water or an organic solvent, a dispersion or suspension of a pigment in a liquid optionally with colour-changing and or colour-shifting properties; a magnetic fluid or a ferrofluid (dispersed or suspended magnetic particles in a liquid that respond to an applied magnetic field); an electrophoretic or electrokinetic fluid (dispersed or suspended charged particles in a liquid that respond to an applied electric field); electrorheological fluids (e.g. fluids that change viscosity in response to applied electric field such as that supplied by Smart Technology Limited, fluid LID3354S), a magnetorheological fluid, a shear thickening or thixotropic material; a high refractive index oil, a low refractive index oil, a fluorinated fluid, Fluoroinert™ electronic liquids such as 3M FC-770; an ionic liquid or liquid electrolyte, an ionic solution, a liquid metal, a metallic alloy with a low melting point such as gallium or and indium containing alloys (such as Indalloy® alloys offered by Indium Corporation); a liquid with a large temperature expansion coefficient; a solution or a dispersion whereby a dissolved or dispersed phase (a gas, a liquid, a solid) goes into or out of solution or dispersion in response to an external stimulus (such as, but not limited to, a change in pressure and or temperature). Optionally, the fluid may be able to undergo a phase change or partial phase change upon application of the external stimulus.

In certain exemplary embodiments described above, each security device may optionally comprise walls to define a lumen for containing the fluid. The walls may be comprised of any material, and take on any form, shape or configuration, and be comprised of any material such as but not limited to: polymers, films, and laminates comprising materials such as thermoplastics, polyolefins, PP, PE, PET, Ultra-Violet curable polymers including free radical systems and cationic systems, Electron-beam curable polymers, BOPP, fluoropolymers, Cytop™, cyclic olefins, thermosetting polymers, spin-on-glass and Sylgard™ silicon elastomers, photoresists including two-photon photoresists, and derivates and mixtures thereof.

In selected embodiments, the walls may define a plurality of conduits, which are continuously filled or selectively fillable, with the fluid. Optionally, the conduits may have a diameter of from 1 nm to 100 μm. Optionally, the conduits may be arranged to form lines of an image.

In further exemplary embodiments, the walls of the device define a reservoir for the fluid, wherein application of pressure to the reservoir causes flow of the fluid into portions of the device other than the reservoir, and optionally upon removal of said pressure, the reservoir at least substantially recovers its original shape and form, thereby to draw the fluid from said other portions of the device and back into the reservoir.

In still further embodiments, the fluid comprising a liquid with macroscopic and/or microscopic particles of solid or gas contained in the liquid, the particles reacting to redistribution of the fluid induced by the external force, so that they form, move, coalesce, rotate, precipitate, aggregate, dissolve, flow or collect in the device. Optionally, the presence and/or visibility of the particles in the liquid is dependent upon the external influence and fluid distribution in the device.

In selected embodiments, a piezoelectric element may be present in the device, whereby manipulation of the piezoelectric element causes the external influence, for redistribution of the fluid in the device by mechanical pressure and/or electrowetting.

One particular advantage of selected embodiments disclosed herein relates to "reaction times" for the change in optical appearance of the security devices. The inventors have determined that security devices comprising nanofluidic or microfluidic structures can achieve optical changes following initiation of an external stimulus in less than 2 minutes. In some cases, an observed change in optical appearance occurs in less than 20 seconds, or less than 10 seconds, or even less than 5 seconds. Such rapid reaction times may also be followed in selected embodiments by a "reset" of the optical appearance back to the original appearance (or an alternative appearance) following removal of the external stimulus. This may also occur fairly rapidly, for example in less than 2 minutes, or less than 20 seconds, or less than 10 seconds, or even less than 5 seconds. Therefore, such security devices comprising nanofluidic or microfluidic structures permit a user of the device to apply an appropriate stimulus and observe a rapid verification response from the device in the form of an optical change: a particularly beneficial feature especially when the security devices are applied for example as authentication devices for bank notes and the like.

Optionally, each security device defined herein may further comprise an adhesive layer for adhesion to a substrate of a security document, and a transparent or translucent layer wherein the fluid can be viewed therethrough.

In other exemplary embodiments, there is provided a use of a security device as described herein, as a security feature of a security document.

In other exemplary embodiments, there is provided a security document comprising:

a core material; and at least one security device as described herein present on at least one side of the core material, or at least partially embedded into the core material, such that the device is at least partly visible in reflected light from said at least one side. Optionally, the core material may comprise at least one material selected from the group consisting of: paper, polymer, plastic, and combinations or hybrids thereof. Optionally, the security document may further comprise printed features printed over the security device, optionally to mask or obscure a presence of the security device or parts thereof.

Further exemplary embodiments provide for a method for manufacture of a bank note, comprising the steps of:

providing a polymer core substrate;

adhering to or embossing upon the substrate a security device as described herein.

In selected embodiments, the step of adhering comprises providing an adhesive layer between the security device and the core substrate, the adhesive layer comprising least one adhesive material selected from acrylated urethanes, methacrylate esters, mercapto-esters and a UV curable adhesives.

Still further embodiments provide for a method for checking whether a security document is a legitimate or counterfeit document, the security document comprising at least one security device as described herein on at least one side thereof, the method comprising the step of:

causing an optical change in the fluid within the device, or components of the device associated with the fluid;

observing the optical change.

Optionally, the step of causing comprises applying an external stimulus to the security device selected from at least one of:

a change in temperature;
exposure to visible or beyond visible light;
shaking, tipping, flipping or vibrating the device;
acceleration or deceleration;
an electric field;
a magnetic field;
a change in potential difference across the device;
induced high or low g-forces; and
bending, folding, flexing or pressing the device, or a part thereof.

In other selected embodiments, the security devices comprise fluid that is flowable, selectively flowable, redistributable, or selectively redistributable within the device, meaning that the liquid can flow or be caused to move or expand from one location to another in the device, for example upon an external influence upon the device such as a force of some kind. In this way, the fluid may optionally be caused to flow into regions of the device previously devoid or substantially devoid of the fluid. In other embodiments, the devices may encompass fluids that are redistributable in the device because they are expandable upon heating or warming of the fluid. In such embodiments, the fluid may optionally be caused to expand into regions of the device previously devoid or substantially devoid of the fluid. Still further embodiments encompass security devices that comprise a fluid that is both flowable and expandable under the influence of one or more specific stimuli, thus giving rise to the fluid redistribution.

Regardless of the nature of the fluid redistribution (e.g. flow and/or expansion etc. of the fluid), the embodiments described herein encompass an entirely new class of security devices for security documents, that incorporate any type of fluids, and associated means for fluid movement/redistribution within the devices. The invention encompasses any configuration of device that includes any type of fluid that can be redistributed in any way within the device. Preferably, the redistribution of the fluid gives rise to a change of appearance of the device (or a change of appearance in the document to which the device is attached) resulting from the fluid redistribution. This change of appearance, whether in visible or beyond visible light, or whether detectable or not detectable to the naked eye, is intended to facilitate an assessment of whether the corresponding security document is legitimate or counterfeit.

Such fluids may be selected from, but not limited to: any of, a liquid, a gas, a mixture or dispersion or solution or colloid or suspension of a gas in a liquid, a liquid foam, a mixture or dispersion or colloid or suspension of a liquid in a liquid, an emulsion, a mixture or dispersion or colloid or suspension of a solid in a liquid, a sol, a gel, a liquid crystal; an oil/water mixture optionally comprising a surfactant; a liquid dye, a solution of a dye in water or an organic solvent, a dispersion or suspension of a pigment in a liquid optionally with colour-changing and or colour-shifting properties; a magnetic fluid or a ferrofluid (dispersed or suspended magnetic particles in a liquid that respond to an applied magnetic field); an electrophoretic or electrokinetic fluid (dispersed or suspended charged particles in a liquid that respond to an applied electric field); electrorheological fluids (e.g. fluids that change viscosity in response to applied electric field such as that supplied by Smart Technology Limited, fluid LID3354S), a magnetorheological fluid, a shear thickening or thixotropic material; a high refractive index oil, a low refractive index oil, a fluorinated fluid, Fluoroinert™ electronic liquids such as 3M FC-770; an ionic liquid or liquid electrolyte, an ionic solution, a liquid metal, a metallic alloy with a low melting point such as gallium or and indium containing alloys (such as Indalloy® alloys offered by Indium Corporation); a liquid with a large temperature expansion coefficient; a solution or a dispersion whereby a dissolved or dispersed phase (a gas, a liquid, a solid) goes into or out of solution or dispersion in response to an external stimulus (such as, but not limited to, a change in pressure and or temperature). For greater certainty, selected security devices disclosed herein that involve fluid redistribution are distinct from electronic paper devices (such as Eink™) because those devices or materials often comprise compartmentalized fluids in discrete compartments or capsules, with little or no opportunity for the fluid present in those compartments and capsules to flow or otherwise move from one place to another. Fluid compartmentalization is intentional and important for electronic paper devices because it is desired to maintain fluid in discrete locations thus to define pixels in the paper. If the fluid were freely flowable from one pixel to another, then the visual affect of the pixels and the capacity to influence the appearance of each individual pixel would be compromised. In direct contrast, the security devices disclosed herein may undergo changes in their appearance that are independent of pixels, and instead dependent upon free and unrestricted (or at least selectively restricted) fluid redistribution about the device.

Thus, certain exemplary embodiments provide a security device for a security document, the security device comprising a fluid contained within the device that is redistributable within the device in response to an external stimulus. Although not a requirement of the device, for many practical embodiments is may be desirable for the fluid to be sealed into the security device, for example by way of its construction and materials. This will help to avoid evaporation and/or leakage of the fluid outside of the channels or walls that contain it, and also the need to replace or replenish the fluid during an extended period of use.

In selected embodiments, the fluid is redistributable by way of fluid flow, the fluid being flowable within the device when an external force is applied to at least a portion of the device. In this way, the fluid may be caused to flow into regions of the device previously devoid or substantially devoid of the fluid.

Example stimuli that may cause the fluid to flow may be selected from, but are not limited to:

a change in temperature;
exposure to visible or beyond visible light;
shaking, tipping, flipping or vibrating the device;
acceleration or deceleration;
an electric field;
a magnetic field;

a change in potential difference across the device;

high g-forces; and bending, folding, flexing or pressing the device, or a part thereof.

In further embodiments, the fluid may comprise a dispersion, a suspension or an emulsion containing solid or liquid particles that can have any size (e.g. nanometer or micrometer dimension) that have some influence upon the optical or flow (e.g. viscosity) properties of the fluid. Such particles may also be movable within the device by virtue of the fact that they are dispersed or suspended within the fluid for example in suspension or emulsion. Moreover, such particles may also be movable within the device upon to one or more of the following external stimuli:

flow of the fluid through the device;

shaking, tipping, flipping or vibrating the device;

acceleration or deceleration;

an electric field;

a magnetic field;

a change in potential difference across the device;

high g-forces; and bending, folding, flexing or pressing the device, or a part thereof.

In other selected embodiments, the device may comprise a fluid that is flowable within the device when an external force applies pressure to at least a portion of the device.

In other embodiments, the fluid is redistributable or able to undergo translocation by fluid expansion, the fluid expandable (i.e. having increased volume) within the device upon warming of the fluid, thereby to cause the fluid to expand into regions of the device previous devoid or substantially devoid of the fluid. In other embodiments, the fluid is redistributable or able to undergo translocation by fluid contraction, the fluid contracting (i.e. having reduced volume) within the device upon cooling of the fluid, thereby to cause the fluid to contract from regions of the device previously filled or substantially containing the fluid. Therefore, in contrast to fluid flow in which the fluid retains substantially the same volume and density, fluid expansion/contraction encompasses for example fluids with high thermal expansion coefficients (e.g. alcohol) in that they expand/contract significantly (and sometimes rapidly) upon warming and cooling. Upon expansion, such fluids may have a decreased density but an increased volume such that they can be caused to redistribute into regions of a security device previously devoid or substantially devoid of the fluid. The embodiments disclosed are also not limited to those that encompass fluids that only flow or expand in response to an external stimulus. Further fluids may both flow and expand or contract, or be induced to undergo any other form of change suitable to cause fluid redistribution in the device.

In further exemplary embodiments of the security devices disclosed herein, the fluid is a gas, or comprises a combination of a liquid and a gas. Optionally, the fluid comprises a liquid portion and a gas portion, whereupon changing the temperature of the gas portion causes expansion or contraction of the gas to force the liquid portion to flow and be redistributed in the device.

In other embodiments, the at least one fluid comprises at least two fluids that mix upon application of the external stimulus, thereby to cause a change in an appearance of the device. Optionally, the mixing of the at least two fluids causes a colour change in the mixed fluids compared to each of the fluids prior to mixing. Alternatively, the mixing of the fluids results in the formation of a colloid, suspension, dispersion or emulsion.

In further exemplary embodiments, at least one of the fluids is a colloid, suspension, dispersion or emulsion, and mixing of the fluids causes particles in said colloid, suspension, dispersion or emulsion at least partially to dissolve, disperse or suspend.

Certain embodiments encompass security devices that comprise walls to define a lumen for containing the fluid, wherein the fluid can be freely redistributed, or selectively redistributed, within the lumen. In some embodiments, the walls may comprise any materials suitable to retain the fluid within the walls, without significant leakage, seepage, evaporation or any other form of escape of the fluid from within the lumen. Such properties for the walls of the device are particularly desired if the device is to be used, or repeatedly used, for an extended period such as for example in a bank note where the device is used as a counterfeit security device. Thus, the device may maintain a degree of structural integrity without fluid loss or a reduction in fluid volume. The walls of the device may comprise any material or materials, or any layers or materials, to achieve this end. For example, the walls may comprise one or more materials selected from the following non-limiting group as a film, layer, or laminate structure: thermoplastics, polyolefins, PP, PE, PET, Ultra-Violet curable polymers including free radical systems and cationic systems, Electron-beam curable polymers, BOPP, fluoropolymers, Cytop™, cyclic olefins, thermosetting polymers, spin-on-glass and Sylgard™ silicon elastomers, photoresists including two-photon photoresists, and derivates and mixtures thereof. In just one example, U.S. Pat. No. 7,060,419, which is incorporated herein by reference, discloses one example system for the production of microfluidic articles involving photoreactive compositions comprising suitable polymers or polymer precursors.

The walls of the security devices disclosed herein may take on any shape, form, pattern or configuration suitable to contain any volume of fluid. For example, the walls may define any size or shape of lumen, including those defined by one or a plurality of conduits. It should also be noted that the entire portion of the lumen of the device may not necessarily be continuously filled or infused with fluid. Indeed, depending upon the way the device operates, significant portions of the device may optionally comprise regions of lumen absent of fluid. For example, in the case of devices comprising deformable or flexible walls of polymer or laminate materials, portions of the device may collapse "flat" until an external influence or force upon another portion of the device causes fluid to flow into and re-fill the "flat" portions with fluid.

In still further embodiments, the walls of the device may comprise a plurality of conduits, which may be continuously filled or selectively finable with the fluid. The conduits may take any shape, size and form, optionally with fluid communication therebetween and/or with other features of the device, including those other features defined by the walls. Optionally, the conduits have an internal dimension or diameter of from 1 nm to 100 μm. Optionally, the conduits are arranged to form of lines of an image, so that flow of fluid into the conduits causes the image to change appearance, or to become visible, or to become invisible.

Optionally, with reference to the other features of the device referred to in the previous paragraph, such other features may optionally include walls configured to define at least one reservoir for the fluid, wherein application of pressure to the reservoir causes flow of the fluid into portions of the device other than the reservoir (such as conduits if present). For example, in some embodiments comprising a reservoir removal of the aforementioned pressure upon the reservoir causes the reservoir at least substantially to recover its original shape and form, thereby to draw (or suck) the fluid from said other portions of the device and back into the reservoir. For example, the reservoir may be optionally resiliently and repeatably deformable, so that any appearance change in the device caused by applying pressure to the reservoir can be repeated by repeated application and withdrawal of the pressure. The pressure upon the device may be from any source, but in many practical embodiments such as those involving bank notes it may be preferred for the reservoir to be resiliently deformable upon application of pressure by a user's hand, or upon hand manipulation of the bank note, such as bending, folding, or pressing the bank note, or a select portion thereof.

In further embodiments, the security devices may include one or more valves that can be used to regulate flow of the fluid about the device, for example through the channels of the device. For example, the valves may be used to provide one-way fluid flow, or to control the speed with which conduits are filled or emptied with fluid and the device is manipulated.

In alternative exemplary embodiments, pressure to the reservoir may be applied via means other than direct hand-to-device pressure. For example, the device may further comprise a piezoelectric element adjacent the reservoir, whereby application of a potential difference across the piezoelectric element causes the element to change shape, thus to apply pressure upon the reservoir sufficient for fluid to flow from the reservoir into portions of the device other than the reservoir. Alternatively, removal of a potential difference across the piezoelectric element causes the element to change shape, thus to apply pressure upon the reservoir sufficient for fluid to flow from the reservoir into portions of the device other than the reservoir.

Regardless of how pressure is applied to the reservoir, the pressure to compress the reservoir may be sufficient to force fluid in the reservoir to flow into a plurality of conduits, thereby to cause a change in an optical appearance of the device. The resulting visual change in the appearance of the device may be dependent upon the arrangement of the conduits (for example in a specific pattern, shape or image), upon the material, colour, transparency and structure of the walls of the conduits (and any overlying layer or layers), as well as the constituents of the fluid contained in the device. The visual change may be decipherable to the naked eye in visible light, but alternatively may only be decipherable in beyond visible light, or on a microscopic scale.

Any of the security devices disclosed herein may optionally comprise an adhesive layer for adhesion to a substrate of a security document, and a transparent or translucent layer wherein the fluid can be viewed therethrough.

Further exemplary embodiments encompass the use of any security device disclosed herein, as a security feature of a security document.

Further exemplary embodiments encompass a security document comprising:

a core material; and at least one security device of any type as described herein, present at least one side of the core material, or at least partially embedded into the core material, such that the device is at least partly visible in reflected light from said at least one side. The core material may comprise any material or combination of materials, but in selected embodiments comprises at least one material selected from the group consisting of: paper, polymer, plastic, and combinations or hybrids thereof.

Optionally, the security device itself comprises conduits within which the fluid can flow, with at least a portion of the conduits visible in the document in reflected light. Such embodiments may be preferred for example when the security device itself lacks conduits and comprises merely a reservoir for the fluid, with an outlet. Application of the device to the core material of the document may bring into alignment the output for the reservoir (of the device) and an input fluidly connected to the conduits present in the core material of the substrate, such that once the device is attached to the core material the two operate in conjunction to provide the desired visual change upon redistribution of fluid in the reservoir and into the conduits.

Alternatively, the reservoir may be an integral feature of the core material of the document, whereas conduits may be present as part of the security device, with fluid communication between the reservoir and the conduits established once the device is applied and affixed to the core material.

Regardless, the reservoir is optionally compressible upon hand-manipulation, flexing, bending or folding of the security document, thereby to cause flow of fluid into other portions of the security device or security document.

If the document comprises conduits as described above, then as before regarding the arrangement of conduits in the disclosed security devices, the conduits may be arranged in the form of a recognizable pattern or image, such that said flow into said other portions causes an image to change, become visible or become invisible, on the document.

Any of the security documents disclosed herein may also comprise printed features printed over the security device, optionally to mask or obscure a presence of the security device or parts thereof. For example, more 'traditional' Gravure or Intaglio Offset printing techniques may optionally be employed to completely or partially 'hide' the presence of a security device as disclosed herein, as a feature of a security document. Alternatively, a security device as disclosed herein may be partially or completely embedded in the core material of the security document, or disposed between layers of the document, thus to obscure the device from view. Optionally, portions of the device may be visible within clear, coloured or transparent windows in the document. For example, a reservoir of fluid may be located in a window such that it can be readily viewed and compressed by a user wishing to assess authenticity of the security document.

Further embodiments will now be described with reference to the following examples, which are merely exemplary and are in no way intended to be limiting with respect to the invention as herein described and claimed.

EXAMPLE 1

Document with Thread-Like Device Containing Fluid

Figure 1B:
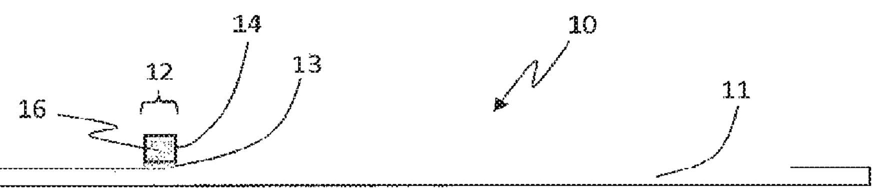
FIG. 1*b* illustrates a cross-sectional view of a security document incorporating an example security device, taken along line A-A' in FIG. 1*a*.

One example of a security document comprising a security device as disclosed herein is presented in FIGS. 1*a* and 1*b*, wherein FIG. 1*a* provides a top-plan view and FIG. 1*b* provides a cross-sectional view through line A-A' shown in FIG. 1*a*. The security document shown generally at 10 includes a core substrate material 11, which in this example is a polymer. Also shown is security device 12 adhered or otherwise affixed to substrate 11 (in the example illustrated adhesive layer 13 provides the necessary adherence). Device 12 comprises walls 14 effectively to provide a closed-ended tube or elongate container, thus to define a thread-like component 15 comprising a lumen for containing fluid 16.

In selected embodiments, fluid 16 may be contained only in discrete regions of the device, and be caused to flow into other regions of the device by an external influence such as pressure on one or more portion(s) of the device (such as by hand-manipulation) or by gravity. In other embodiments, the fluid has a large thermal expansion coefficient, such that upon heating of the device (or the substrate on which the device is located) the fluid in caused to expand in terms of its volume, and fill a greater portion of the lumen.

Either fluid flow or fluid expansion may cause the appearance of the security device to change, at least upon inspection of the device by a user of the security document or upon placing the security device in a 'reader' suitable to reveal the change. For example, the change may be a change in colour of the security thread or a portion thereof, or a change in reflectivity or transparency depending upon the fluid used and the material of the walls 14 of the device.

In selected embodiments, walls 14 may comprise a flexible material such that any portion of the security device 12 that does not contain fluid 16 collapses to be substantially flush with the substrate 11, and assumes an expanded form when infused with fluid flowing or expanding from other regions of the device.

EXAMPLE 2

Document with Reservoir and Thread-Like Component

Figure 2A:
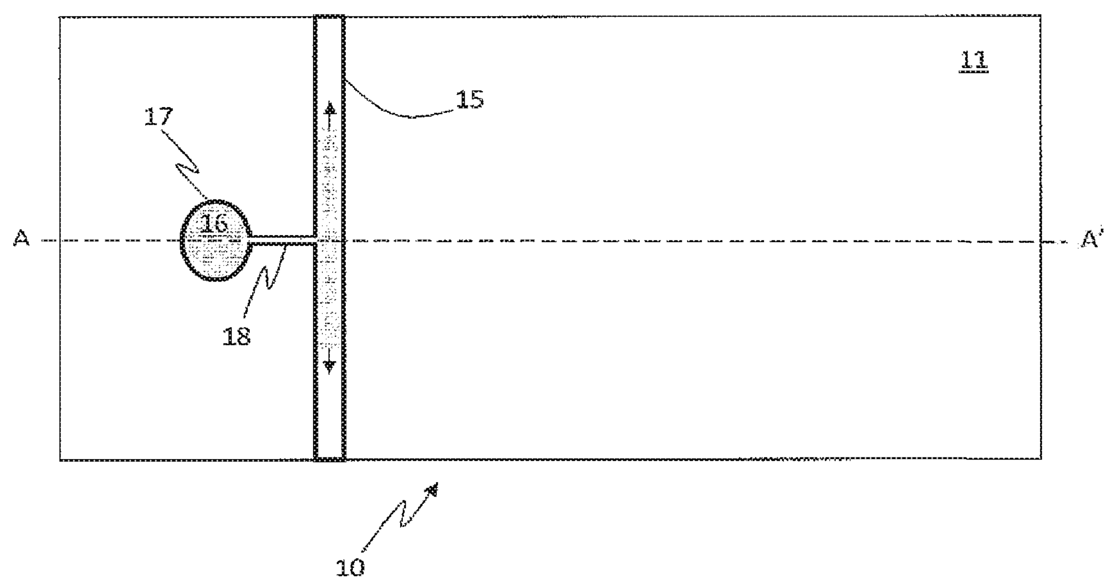
FIG. 2*a* illustrates a top plan view of a security document incorporating an example security device.
Figure 2B:
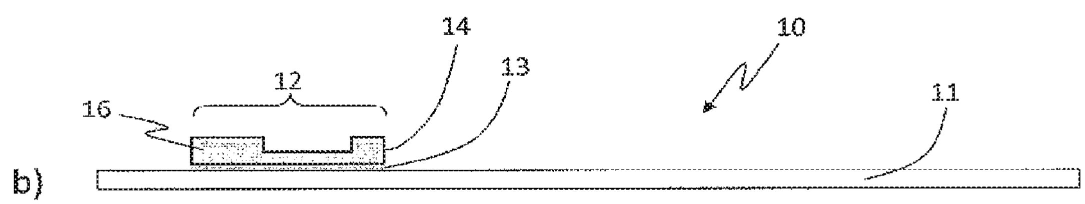
FIG. 2*b* illustrates a cross-sectional view of a security document incorporating an example security device, taken along line A-A' in FIG. 2*a*.

FIGS. 2*a* and 2*b* illustrate another exemplary embodiment similar to FIGS. 1*a* and 1*b* except for additional features. Again, FIG. 2*a* illustrates a top-plan view and FIG. 2*b* provides a cross-sectional view through line A-A' shown in FIG. 2*a*. The features of the document are similar to FIGS. 1*a* and 1*b*. The security document is shown generally at 10, with a substrate 11 and security device 12. However, as illustrated in FIGS. 2*a* and 2*b*, the security device 12 comprises not only walls 14 to define a thread-like component 15. In addition, device 12 includes fluid reservoir 17 and conduit 18 for providing fluid connection from the reservoir 16 to thread-like component 15. In this embodiment, reservoir 16 is comprised of a resiliently deformable material (e.g. a polymer or related laminate structure) such that in an absence of mechanical pressure upon the reservoir it tends to assume an expanded state suitable to contain a volume of fluid 16. For example, in an absence of mechanical pressure upon the reservoir 16, it may contain all fluid 16 in the device, such that thread-like component 15 is at least substantially devoid of fluid.

However, upon application of a mechanical pressure (e.g. by hand manipulation) to reservoir 16 fluid may be forced to flow out of the reservoir to relieve fluid pressure in the lumen of the reservoir. For this purpose, the fluid 16 may be caused to flow through conduit 18 and into the lumen of thread-like member 15, to fill or partially fill the thread-like member (see arrows in thread-like member 15), resulting in a change of appearance in the device.

Optionally, reservoir 17 may be resiliently deformable such that upon removal of mechanical pressure to the reservoir it tends to resume its original shape and form. In doing so, the fluid that flowed into the thread-like member 15 back into the reservoir 17 via conduit 18 may be drawn back into the reservoir. Thus, if any change in appearance in the security device resulted from the application of mechanical pressure to the reservoir, then flow of the fluid back into the reservoir after removal of the mechanical pressure may result in the security device resuming its original appearance. In other embodiments, it may be preferred for the security device to be a "single-use" device, in which case the reservoir may deform only once, and/or conduit 18 (or the exit of reservoir 17) could optionally include a one-way valve (not shown) for one-time passage therethrough of the fluid 16 from reservoir 17 to thread-like member 15. Alternatively, such a valve may permit slow back-flow of fluid so that the reservoir is permitted to refill over a period of time.

EXAMPLE 3

Document with Reservoir and Plurality of Conduits

Figure 3A:
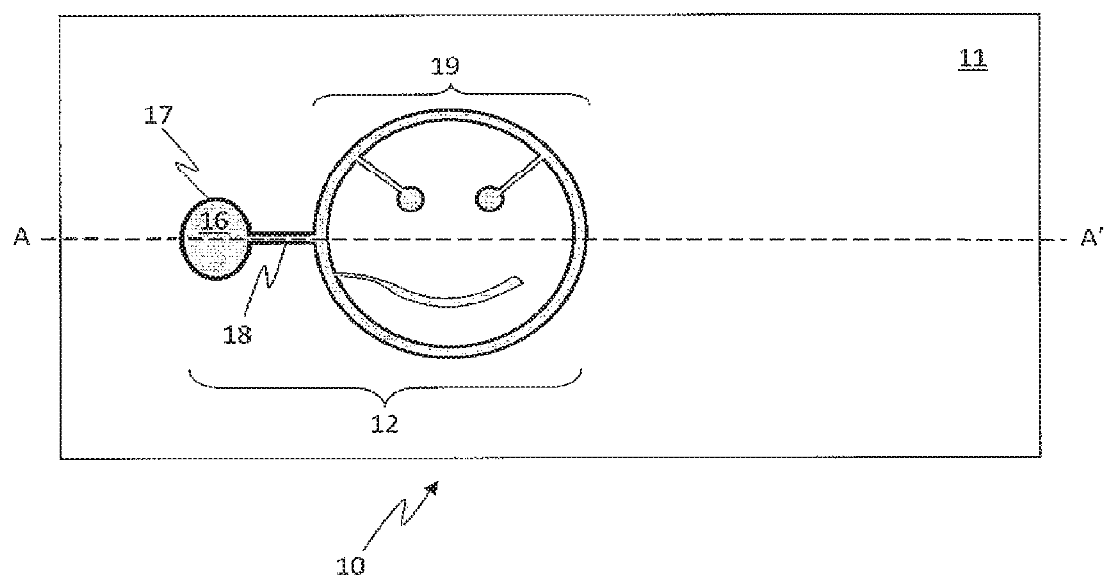
FIG. 3*a* illustrates a top plan view of a security document incorporating an example security device.
Figure 3B:
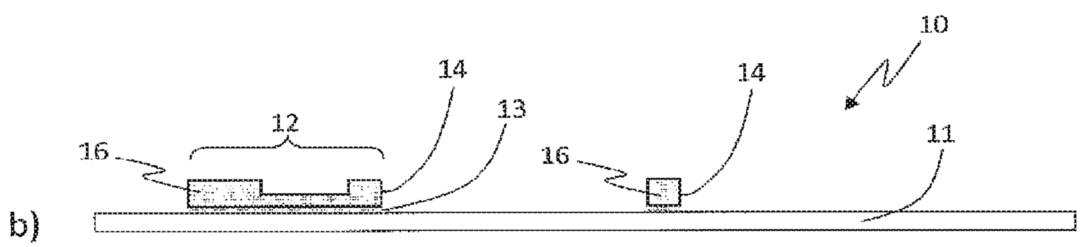
FIG. 3*b* illustrates a cross-sectional view of a security document incorporating an example security device, taken along line A-A' in FIG. 3*a*.

FIGS. 3*a* and 3*b* illustrate another exemplary embodiment similar to FIGS. 2*a* and 2*b* except for alternative features. Again, FIG. 3*a* illustrates a top-plan view and FIG. 3*b* provides a cross-sectional view through line A-A' shown in FIG. 3*a*. The security document is again shown generally at 10, with a substrate 11 and security device 12. However, as illustrated in FIGS. 2*a* and 2*b*, the security device 12 comprises not only fluid reservoir 17 and conduit 18, the device comprises a plurality of conduits 19 in replacement of thread-like component 15. The reservoir 17, conduit 18 and plurality of conduits 19 comprise a lumen with continuous fluid communication between them. In this way, application of a mechanical pressure to reservoir 17 causes fluid 16 to flow through conduit 18 and into the plurality of conduits 19, thereby to cause the plurality of conduits to change their physical appearance when viewed in visible light or with the assistance of a reader or other analytical tool. Therefore, application of a mechanical pressure to reservoir 17 may cause an image to appear in another region of the bank note: in the embodiment illustrated a simplified facial image appears, although any image of any form, shape or complexity may be generated according to the design and configuration of the plurality of conduits.

In still further embodiments, multiple reservoirs and multiple sets of pluralities of conduits could be used to generate even more complex visual changes to the security document. Although not illustrated, several different reservoirs could each supply fluid of a different colour (or other differing optical properties) to different conduits, thus giving rise to visual changes for example generating a colour image perception to the user of the device.

Optionally, the presence of each reservoir or other components of the device may be readily discernible by a user upon visual inspection of the device. In other embodiments, portions of the device may be masked or otherwise hidden from view such that they are cryptic, or only revealed when the fluid is caused to flow or expand in the device. For example, the plurality of conduits may be difficult or impossible to see until fluid flows or expands into them, thus giving the impression of an appearing or disappearing image depending upon the manipulation of the device. Additional printing techniques such as Gravure or Intaglio offset printing may be used to modify or adapt an appearance of the conduits, so that their presence or configuration is difficult to discern. In other examples, each reservoir may be masked by layers or hidden from view within the substrate material of the security document.

EXAMPLE 4

Document with Elongate Reservoir

Figure 4A:
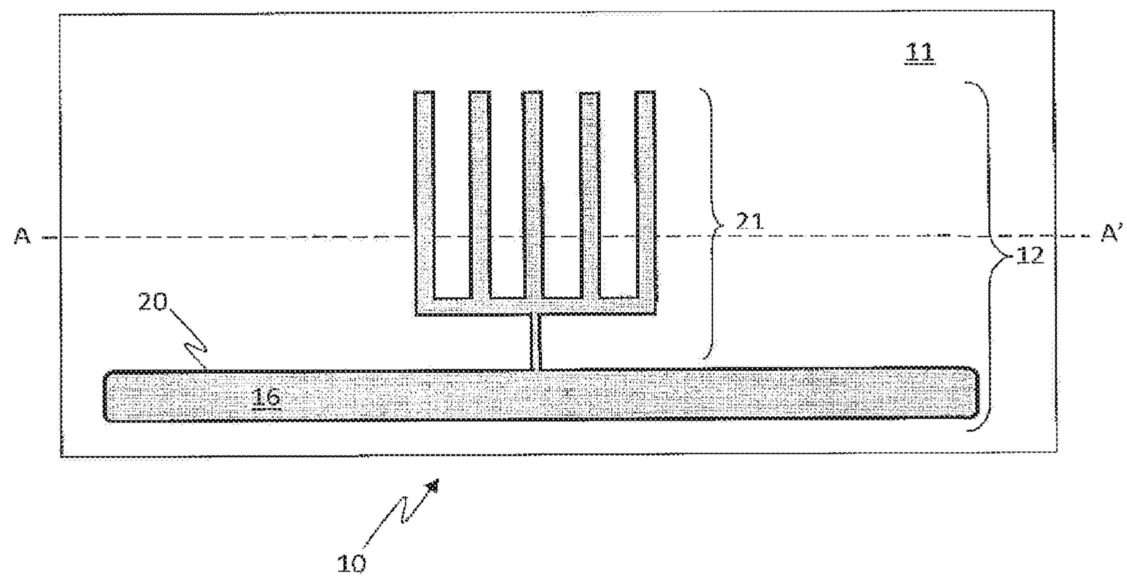
FIG. 4*a* illustrates a top plan view of a security document incorporating an example security device.
Figure 4B:
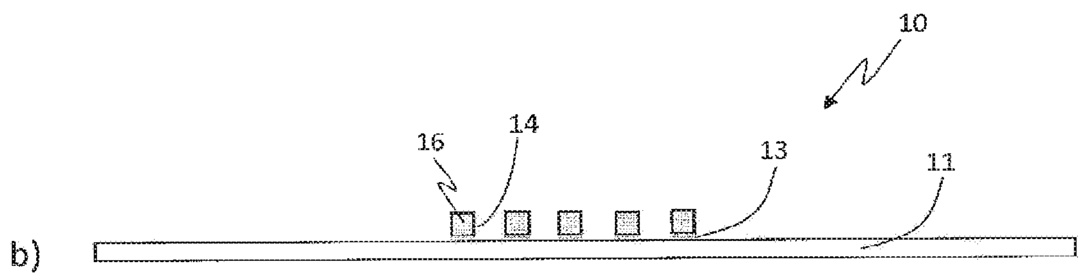
FIG. 4*b* illustrates a cross-sectional view of a security document incorporating an example security device, taken along line A-A' in FIG. 4*a*.

FIGS. 4*a* and 4*b* illustrate another embodiment comprising a reservoir for containing fluid. Again, FIG. 4*a* illustrates a top-plan view and FIG. 4*b* provides a cross-sectional view through line A-A' shown in FIG. 4*a*. The security document is again shown generally at 10, with a substrate 11 and security device 12. However, in this embodiment security device 12 comprises elongate reservoir 20 extending longitudinally along a length of the document. The reservoir 20 is arranged and configured on the document such that any longitudinal bending, flexing or folding of the document causes some degree of compression of reservoir 20 sufficient to cause mechanical pressure upon the fluid 16 contained therein. As a result, fluid 16 may be caused to flow out of reservoir 20 and into plurality of conduits 21 thus to produce a change in the appearance of the document in a manner similar to that discussed for other embodiments.

EXAMPLE 5

Document with Security Device with Fluid Comprising Gas and Liquid

Figure 5A:
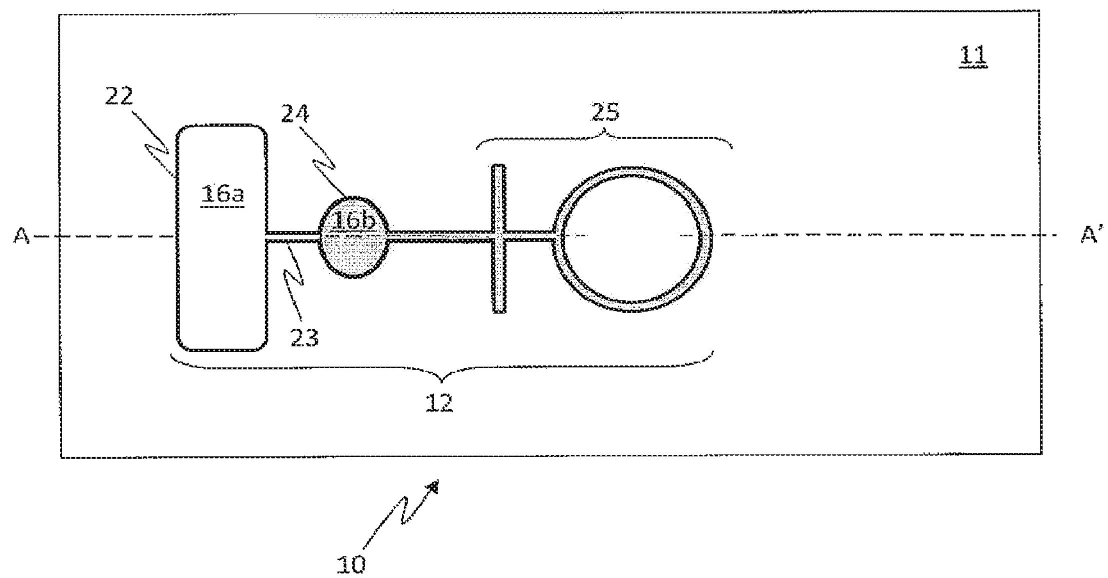
FIG. 5*a* illustrates a top plan view of a security document incorporating an example security device.
Figure 5B:
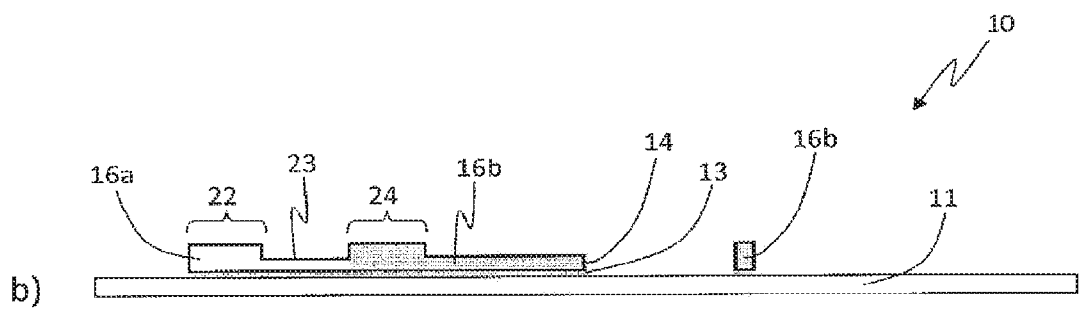
FIG. 5*b* illustrates a cross-sectional view of a security document incorporating an example security device, taken along line A-A' in FIG. 5*a*.

A further embodiment is illustrated in FIGS. 5*a* and 5*b*. As before, FIG. 5*a* illustrates a top-plan view and FIG. 5*b* provides a cross-sectional view through line A-A' shown in FIG. 5*a*. The security document is again shown generally at 10, with a substrate 11 and a security device 12. In this embodiment fluid 16 contained within walls 13 of the security device comprises a gas portion and a liquid portion. The security device 12 is shown in an 'unactivated' state, in which a gas portion 16*a* of the fluid 16 resides at least substantially within gas reservoir 22. Conduit 23 provides fluid contact between gas reservoir 22 and liquid reservoir 24. A liquid portion 16*b* of the fluid 16 at least substantially resides within liquid reservoir 23. Optionally, gas portion 16*a* comprises a distinct gaseous substance compared to liquid portion 16*b*, or alternatively gas portion 16*a* comprises a gaseous version or vapour phase of liquid portion 16*b*.

Regardless, warming or application of heat to a region of the security document 10 at or adjacent gas reservoir 22 causes expansion of gas portion 16*a*, thereby to cause rapid expansion of the gas portion 16*a* into conduit 23 and ultimately into liquid reservoir 24. In view of the lack of compressibility of the liquid portion 16*b* of fluid 16, the liquid portion 16*b* is forced by the influx of expanding gas portion 16*a*, out of liquid reservoir 24, and into the plurality of conduits 25 (this time arranged as a number "10"), thereby giving rise to a visual change in the appearance of the security device 12, and the security document 10. Any degree of warming may be required to gas reservoir 22 to cause expansion of gas portion 16*a*. However, in selected embodiments, the heat from a small lamp, or the heat from a user's hand, may be sufficient to induce the expansion with the resulting appearance change.

Still further embodiments (not illustrated) may involve thermal expansion of liquids in addition to or instead of gases. For example, such security devices may comprise fluid expandable or flowable in response to warming, such as liquids typically found in thermometers.

EXAMPLE 6

Document with Mixing of Two Fluids

Figure 6A:
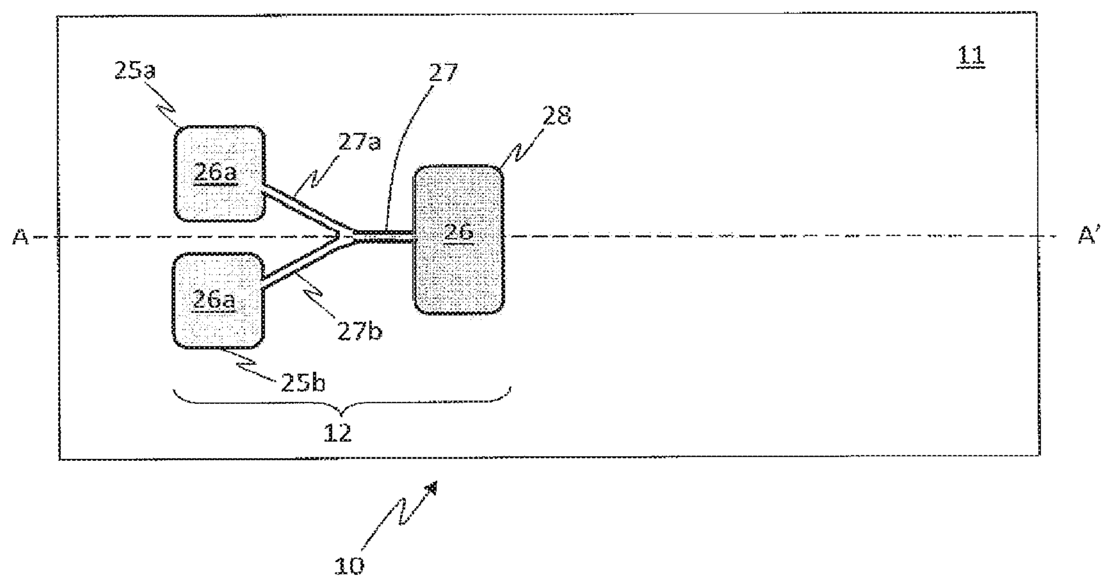
FIG. 6*a* illustrates a top plan view of a security document incorporating an example security device.
Figure 6B:
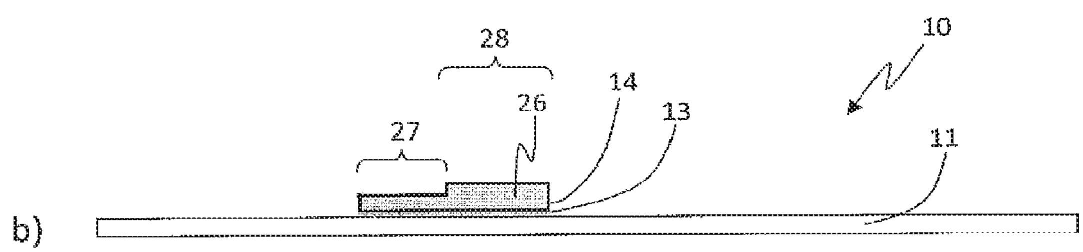
FIG. 6*b* illustrates a cross-sectional view of a security document incorporating an example security device, taken along line A-A' in FIG. 6*a*.

FIGS. 6*a* and 6*b* illustrate a further embodiment wherein two fluids are mixed to give rise to an appearance change. As before, FIG. 6*a* illustrates a top-plan view and FIG. 6*b* provides a cross-sectional view through line A-A' shown in FIG. 6*a*. The security document is again shown generally at 10, with a substrate 11 and a security device 12. In this embodiment, security device 12 comprises two reservoirs 25*a* and 25*b*, each comprising a different fluid 26*a* and 26*b* respectively. Fluids 26*a* and 26*b* are different from one another in any way (colour, phase, transparency, one may be a colloid and the other a suspension or solution, etc.) providing that upon mixing an observable change occurs in the physical appearance of the fluids (i.e. the mixed fluid appears different in some way compared to either of the fluids prior to mixing).

Upon 'activation' of the security device 12 by application of an external stimulus, fluids 26*a* and 26*b* either flow or expand into conduit branches 27*a*, 27*b* so that they contact and mix either prior to or upon entry into mixing reservoir 28. As discussed above, the result of the mixing is to achieve an observable change in the appearance of the mixed fluids as compared to the fluids prior to mixing. Optionally, the mixed fluid may flow or expand further out of mixing reservoir 28 and into a further plurality of conduits (not shown) as discussed for previous embodiments, thereby to provide a more complex appearance change.

Depending upon the nature of the fluids, it may be possible readily to reverse the process, and to separate the mixed fluids back into their previous unmixed forms either by removal of the external stimulus or by application of an alternative external stimulus as required. This may be desired if the security device is to be used repeatedly. For example, fluids 26*a* and 26*b* may pertain to immiscible liquids, or one may be a liquid and the other a gas or particulate solid. In this way, means may be present as an integral component of the security document 10 or security device 12 to cause separation of the mixed liquid upon removal of the external stimulus. For example, filters may be present in conduit 27 such that upon removal of the external stimulus the fluid 16 is drawn back into conduit 27, and separated so that fluids 16*a*, 16*b* are ultimately drawn back into each of the fluid reservoirs 16*a*, 16*b*.

In further related embodiments (not illustrated) reversible mixing and precipitation may occur within the same fluid reservoir. An initially precipitated phase (gas, liquid, solid) may be dissolved or dispersed or suspended in a liquid medium under the application or removal of an external stimulus. Alternatively, an initially dissolved or dispersed or suspended phase (gas, liquid, solid) is precipitated from a liquid medium under the application or removal of an external stimulus. This reversible mixing and precipitation do not necessarily require two separate reservoirs.

EXAMPLE 7

Figure 7A:
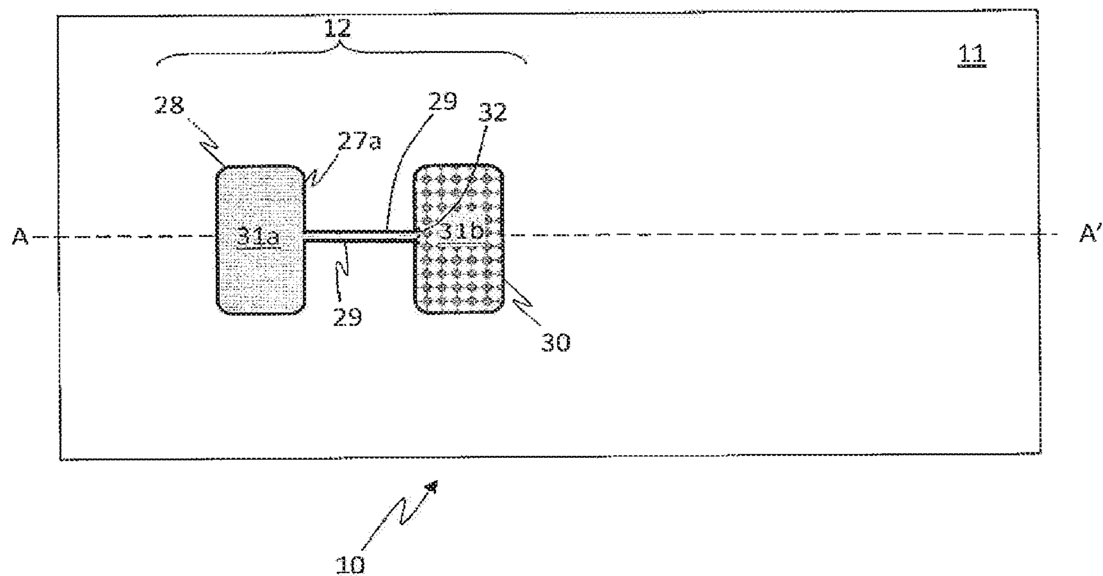
FIG. 7*a* illustrates a top plan view of a security document incorporating an example security device.
Figure 7B:
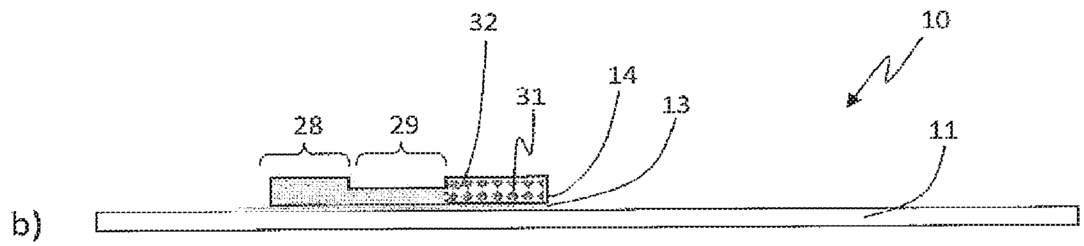
FIG. 7*b* illustrates a cross-sectional view of a security document incorporating an example security device, taken along line A-A' in FIG. 7*a*.

Document Comprising Security Device for Forming or Modifying a Colloid, Dispersion, Suspension, Emulsion or Solution FIGS. 7*a* and 7*b* illustrate a further embodiment wherein two fluids are mixed to form or to modify a particulate material, or a colloid, dispersion, suspension, emulsion, or solution thereby to give rise to an appearance change. As before, FIG. 7*a* illustrates a top-plan view and FIG. 7*b* provides a cross-sectional view through line A-A' shown in FIG. 7*a*. The security document is again shown generally at 10, with a substrate 11 and a security device 12. In this embodiment, security device 12 comprises fluid reservoir 28 for containing fluid 31*a*. Application of an external stimulus to the security device causes flow or expansion of fluid 31*a* through conduit 29 and into second fluid reservoir 30. As shown in FIGS. 7*a* and 7*b*, a particulate fluid 31*b* (comprising particles, or a dispersion, a colloid, a suspension or an emulsion) is already present in second fluid reservoir 30 before influx of fluid 31*a*. Upon mixing of fluids 31*a* and 31*b* in second fluid reservoir 30 an appearance of change may be observed wherein the mixed fluids appear different from either of the fluids prior to their mixing. The appearance change may result from any interaction between the fluids. For example, the mixing may cause the particles in the fluid 31*b* to dissolve thus causing the mixed fluid to appear transparent or more translucent compared to the unmixed fluid 31*b*. Also shown in FIGS. 7*a* and 7*b* is optional particle filer 32, which if present may prevent particles in fluid 31*b* from exiting second reservoir 30.

Optionally, the fluid 31*b* may be devoid of particles of any type until fluid 31*a* becomes mixed with it. For example, if fluids 31*a* and 31*b* are immiscible liquids then their mixing in reservoir 30 may give rise to an emulsion. Alternatively, mixing of the liquids may cause a substance to precipitate out of solution, thus giving rise to a colloid, suspension or dispersion in second reservoir 30.

Regardless, the mixing that occurs between fluids 31*a* and 31*b* may be irreversible. However, in other selected embodiments the device 12 may be a device with repeatable functionality, such that the fluids 31*a* and 31*b* may be separated after mixing. For example, the fluids 31*a* and 31*b* may be separated by removal of the external stimulus or application of an alternative external stimulus, so that fluid 31*a* is drawn back out of second reservoir 30 and into reservoir 28 via conduit 29.

EXAMPLE 8

Document Comprising Security Device with Piezoelectric Element

Figure 8A:
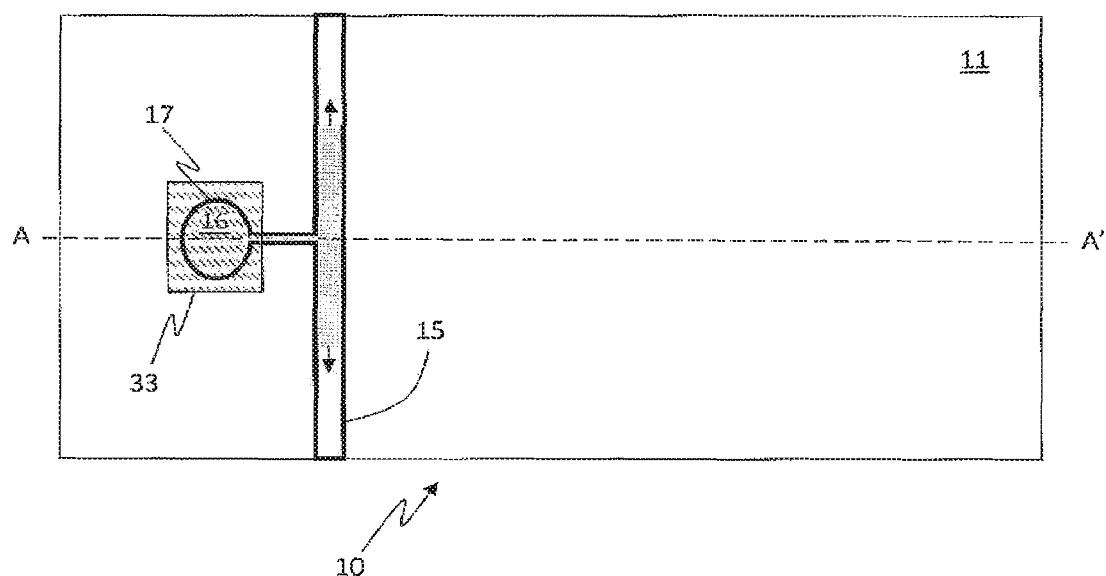
FIG. 8*a* illustrates a top plan view of a security document incorporating an example security device.
Figure 8B:
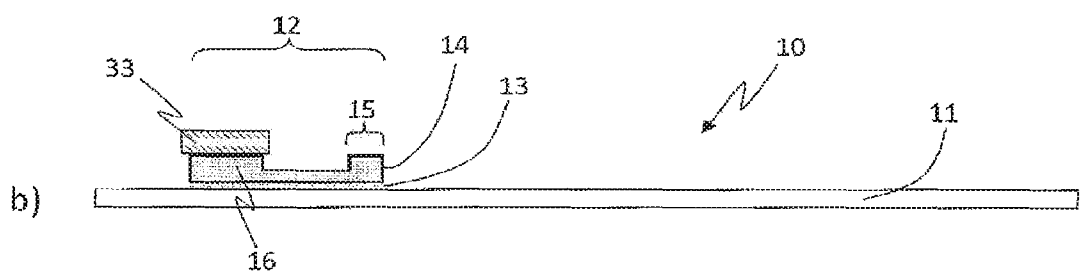
FIG. 8*b* illustrates a cross-sectional view of a security document incorporating an example security device, taken along line A-A' in FIG. 8*a*.

FIGS. 8*a* and 8*b* illustrate another exemplary embodiment similar to FIGS. 2*a* and 2*b* except for additional features. Again, FIG. 8*a* illustrates a top-plan view and FIG. 8*b* provides a cross-sectional view through line A-A' shown in FIG. 8*a*. The security document is again shown generally at 10, with a substrate 11 and security device 12. However, as illustrated in FIGS. 2*a* and 2*b*, the security device 12 comprises not only fluid reservoir 17 and conduit 18, the device further comprises piezoelectric element 33, which in this example overlays reservoir 17. In effect, piezoelectric element 33 provides a means to apply mechanical pressure to reservoir 17 instead of hand manipulation (as discussed for FIGS. 2*a* and 2*b*). The provision of an electric potential difference across piezoelectric element 33 causes the piezoelectric element 33 to change shape in a manner suitable to cause increased pressure upon reservoir 17 and the fluid 16 contained therein. The potential difference may be cause by wires and/or other components (not shown) forming part of the security device 12, or alternatively may result from the positioning of the security document 10 into or adjacent a suitable reader device that in some way causes the potential difference across the piezoelectric element 33. Regardless of how the electrical potential difference is achieved, the effect upon the device is ultimately the application by the piezoelectric element 33 of mechanical pressure to achieve a desired appearance change resulting from fluid flow.

Although not illustrated in FIGS. 8*a* and 8*b*, certain embodiments encompass the use of any piezoelectric element of any format or configuration to influence any other components of a security device thus to cause fluid flow within the device. Multiple piezoelectric elements may also be used, including such elements on both sides of a security document or device (for example to increase resulting mechanical pressure on certain parts of a security device). In addition, other embodiments encompass the use of piezoelectric elements that change shape upon exposure to an electrical potential difference to reduce (instead of increase) mechanical pressure upon certain parts of a security device.

In even more sophistical embodiments, multiple piezoelectric elements may be present in a single device, with each exerting an influence upon different fluid compartments or channels, for example each containing different fluid type or colour. Thus, the overall affects of exposure of the security device to an electrical potential difference may cause multiple fluids to flow in different ways about the security device, with a resulting complex (e.g. multicolour) appearance change.

In still further embodiments (not shown) the security device may further comprise a piezoelectric element, whereby a change in mechanical pressure or strain across the piezoelectric element causes a change in potential difference which causes fluid redistribution by electrowetting.

EXAMPLE 9

Method for Manufacture of a Security Document

Figure 9:
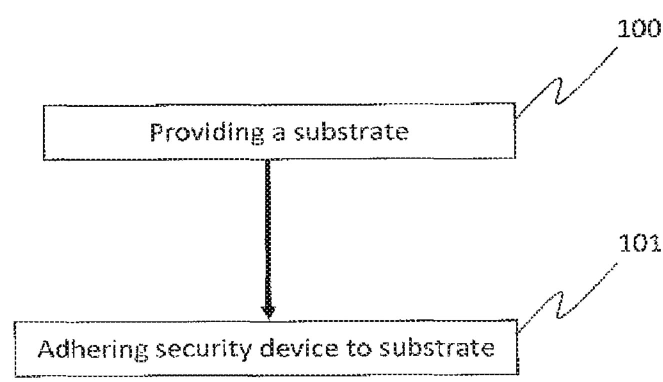
FIG. 9 illustrates a method for producing an optically variable device.

FIG. 9 illustrates further exemplary embodiments comprising a method for manufacture of a bank note, the method comprising the steps of:

in step 100 providing a substrate;

in step 101 adhering to the substrate a security device as disclosed herein.

Optionally, the step of adhering comprises providing an adhesive layer between the security device and the core substrate, the adhesive layer comprising least one adhesive material selected from acrylated urethanes, methacrylate esters, mercapto-esters and a UV curable adhesives.

Alternatively, a security device as disclosed herein may be manufactured in situ upon the document substrate.

Regardless, any technique known in the art may be used in the manufacture of the security devices as disclosed herein, including but not limited to soft embossing, hot embossing, printing, stamping and photolithography.

EXAMPLE 10

Method to Check for a Legitimate or Counterfeit Security Document

Figure 10:
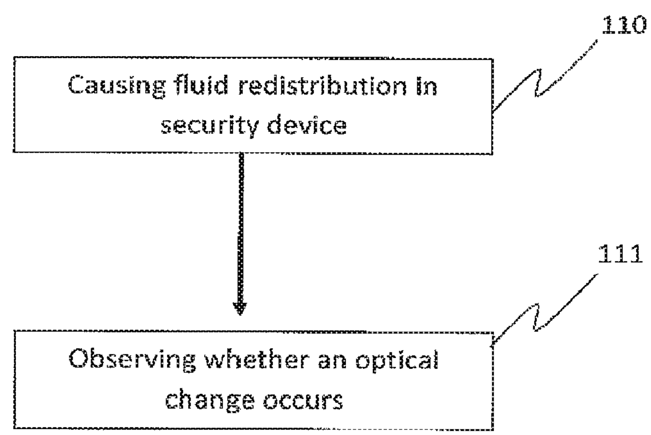
FIG. 10 illustrates a method for checking the legitimacy of a security document.

In FIG. 10, there is provided an example method for checking whether a security document is a legitimate or counterfeit document, the security document comprising at least one security device as disclosed herein, embedded in or disposed upon at least one side of the core material of the document, the method comprising the step of:

In step 110 causing the at least one fluid to be redistributed in the device;

In step 111 observing an optical change in the appearance of the security document caused by the fluid redistribution.

Optionally, the step of causing comprises applying an external stimulus to the security device selected from at least one of:

a change in temperature;

exposure to visible or beyond visible light;

shaking, tipping or vibrating the device;

acceleration or deceleration;

an electric field;

a magnetic field;

a change in potential difference across the device;

high g-forces; and bending, folding, flexing or pressing the device, or a part thereof.

Whilst various embodiments of security devices, security documents, as well as methods for their production and use, are described and illustrated herein, the scope of the appended claims is not limited to such embodiments, and the invention encompasses further embodiments readily obtainable in view the teachings presented herein.

The invention claimed is:

1. A security device for a security document, the device comprising a fluidic structure containing a plurality of conduits arranged in a pattern or image and one or more liquids sealed within the plurality of conduits, wherein the fluidic structure is a microfluidic or nanofluidic structure, and wherein the one or more liquids are sealed within the plurality of conduits so that the plurality of conduits are continuously filled with the one or more liquids;

wherein the one or more liquids filling the plurality of conduits comprise a single liquid phase and wherein each of the plurality of conduits has a dimension of 1 nm to 100 μm between opposing walls.

2. The security device according to claim 1, wherein the walls comprise one or more materials selected from one of polymers, films, and laminates.

3. The security device according to claim 2, wherein the walls comprise one or more materials selected from one of thermoplastics, polyolefins, PP, PE, PET, Ultra-Violet curable polymers including free radical systems and cationic systems, Electron-beam curable polymers, BOPP, fluoropolymers, cyclic olefins, thermosetting polymers, spin-on-glass and silicon elastomers, photoresists including two-photon photoresists, and derivates and mixtures thereof.

4. The security document comprising:

a core material; and at least one security device according to claim 1 present on at least one side of the core material, or at least partially embedded into the core material, such that the device is at least partly visible in reflected light from said at least one side.

5. The security document according to claim 4, wherein the core material comprises at least one material selected from the group consisting of: paper, polymer, plastic, and combinations or hybrids thereof.

* * * * *